(12) United States Patent
Wu et al.

(10) Patent No.: US 7,826,435 B1
(45) Date of Patent: Nov. 2, 2010

(54) POWER CONTROL IN OFDM AND OFDMA WIRELESS COMMUNICATION NETWORKS

(75) Inventors: Jun Wu, San Diego, CA (US); Keqiang Zhu, San Diego, CA (US); Yonggang Fang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 1208 days.

(21) Appl. No.: 11/072,741

(22) Filed: Mar. 3, 2005

Related U.S. Application Data (60) Provisional application No. 60/550,969, filed on Mar. 5, 2005.

(51) Int. Cl.
*H04B 7/216* (2006.01)
*H04K 1/10* (2006.01)

(52) U.S. Cl. .................. 370/342; 370/335; 375/260

(58) Field of Classification Search .......... 370/282, 370/335, 342; 375/130, 260–264; 455/69
See application file for complete search history.

(56) References Cited

U.S. PATENT DOCUMENTS

| | | | |
|---|---|---|---|
| 6,263,368 B1 | 7/2001 | Martin | |
| 6,292,651 B1 * | 9/2001 | Dapper et al. | 725/106 |
| 6,292,671 B1 | 9/2001 | Mansour | |
| 6,385,457 B1 * | 5/2002 | Dam et al. | 455/456.2 |
| 6,392,483 B2 * | 5/2002 | Suzuki et al. | 330/151 |
| 6,480,522 B1 * | 11/2002 | Hoole et al. | 375/130 |
| 6,751,444 B1 * | 6/2004 | Meiyappan | 455/69 |
| 6,795,424 B1 * | 9/2004 | Kapoor et al. | 370/343 |
| 7,239,659 B2 * | 7/2007 | Thomas et al. | 375/141 |
| 7,319,384 B2 * | 1/2008 | Wakisaka et al. | 340/538 |
| 2002/0085516 A1 | 7/2002 | Bridgelall | |
| 2003/0065805 A1 | 4/2003 | Barnes, Jr. | |
| 2003/0103470 A1 * | 6/2003 | Yafuso | 370/282 |
| 2004/0009783 A1 * | 1/2004 | Miyoshi | 455/522 |
| 2005/0163067 A1 * | 7/2005 | Okamoto et al. | 370/321 |
| 2006/0028977 A1 * | 2/2006 | Izumi | 370/203 |
| 2006/0067207 A1 * | 3/2006 | Miyoshi | 370/210 |
| 2007/0149147 A1 * | 6/2007 | Kishimoto et al. | 455/102 |

* cited by examiner

*Primary Examiner*—Thai D Hoang
(74) *Attorney, Agent, or Firm*—Perkins Coie LLP

(57) ABSTRACT

Methods and systems are described for implementing power control in OFDM and OFDMA wireless communication systems.

17 Claims, 5 Drawing Sheets

POWER CONTROL IN OFDM AND OFDMA WIRELESS COMMUNICATION NETWORKS

This application claims the benefit of U.S. Provisional Patent Application No. 60/550,969 entitled "POWER CONTROL IN OFDM AND OFDMA WIRELESS COMMUNICATION NETWORKS" and filed Mar. 5, 2005, this disclosure of which is incorporated herein by reference as part of the specification of this application.

BACKGROUND

This application relates to wireless communication systems and techniques.

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. For a given wireless system, the communication capacity increases as the number of the communication frequency channels increases. Two different frequency channels, when placed too close to each other in frequency, can interfere or cross talk with each other to create noise and thus reduce the signal-to-noise ratio. One technique to reduce the minimum frequency spacing between two adjacent channels is to generate different channels within a given band by using the orthogonal frequency division multiplexing (OFDM) to generate channel spectral profiles that are orthogonal to one another without interference when different channels are centered at selected equally-spaced frequencies. Under the OFDM, the frequency spacing can be smaller than the minimum spacing in conventional frequency channels and hence increase the number of channels within a given band. The existing and developing specifications under IEEE 806.16x standards support wireless communications under OFDM and orthogonal frequency division multiple access (OFDMA). The draft for IEEE 806.16d published in January 2004 provides technical specifications for OFDM and OFDMA wireless systems.

In OFDM and OFDMA systems, it is desirable to control the transmitting power levels at different frequencies in order to achieve desired system operations, e.g., maintaining a certain level of the system performance such as the quality of service (QoS).

SUMMARY

This application includes systems and techniques for power control in OFDM and OFDMA wireless communication systems. In one implementation, the power levels of OFDM subcarriers that are generated from a transmitter and are received at a receiver in a wireless communication system using OFDM subcarriers are measured. The transmitting power levels of the OFDM subcarriers at the transmitter are controlled in response to the measured power levels to make the power levels of OFDM subcarriers received at the receiver approximately equal to one another.

In another implementation, a communication system is described to include base stations, base station controller, and two different power control mechanisms. The base stations are spatially distributed to wirelessly communicate with subscriber stations via radio links that comprise OFDM subcarriers. Each base station controller is coupled to control and communicate with two or more base stations. The first power control mechanism of this particular system is to measure power levels of OFDM subcarriers in a signal that is either (1) generated at a transmitting subscriber station and received at a receiving base station, or (2) generated at a transmitting base station and received at a receiving subscriber station. The second power control mechanism of this particular system is to control an averaged power level of a signal measured at a receiving base station and generated from a transmitting subscriber station to be approximately equal to averaged power levels of signals received at the receiving base station that are generated from other subscriber stations.

A method is also disclosed for transmitting orthogonal frequency division multiplexing (OFDM) subcarriers from a transmitter to a receiver in a wireless communication system that uses OFDM subcarriers and frequency division duplex (FDD) in an air link between the transmitter and the receiver. The OFDM subcarriers are separated into different OFDM subcarrier groups where each OFDM subcarrier group comprises a plurality of OFDM subcarriers that are different from OFDM subcarriers in another OFDM subcarrier group. The averaged power level of OFDM subcarriers in each of the OFDM subcarrier groups received at the receiver are measured. The measured averaged power level of each of the OFDM subcarrier groups is communicated to the transmitter. The transmitting power levels of the OFDM subcarriers at the transmitter are controlled to make averaged power levels of different OFDM subcarrier groups approximately equal at the receiver.

These and other implementations, examples, variations, and associated advantages are described in detail in the following drawings, textual description, and claims.

DETAILED DESCRIPTION

Wireless communication systems based on OFDM and OFDMA may implement power control mechanisms that measure and adjust the transmitting power levels of subscriber stations (e.g., mobile stations) so that the average power levels from subscriber stations are similar or approximately equal at a base station receiver. Such power control of the average power level, however, may not be sufficient to maintain a desired signal-to-noise ratio at the base station receiver.

For example, it is well known that a radio signal in a wireless system from a transmitter, which may be a subscriber station such as a mobile phone or a base station, to a receiver, which may be a base station or subscriber station such as a mobile phone, may not propagate in a single path under various operating conditions. Such a radio signal may be replicated into multiple copies that respectively propagate through different paths due to various factors such as objects present within the reach of the radio signal during the transmission. A replicated signal may be produced by various mechanisms, e.g., reflection, diffraction, or scattering of the radio signal by one or more objects or by a combination of two or more of different mechanisms. Hence, the ideal transmission path is not a simple line-of-sight path from the transmitter to the receiver but often includes multiple transmission paths. Different replicas of the original radio signal from the transmitter may carry different signal distortions and arrive at the receiver at different times. The received signal at the receiver, therefore, is the sum of such replicas.

Figure 1:
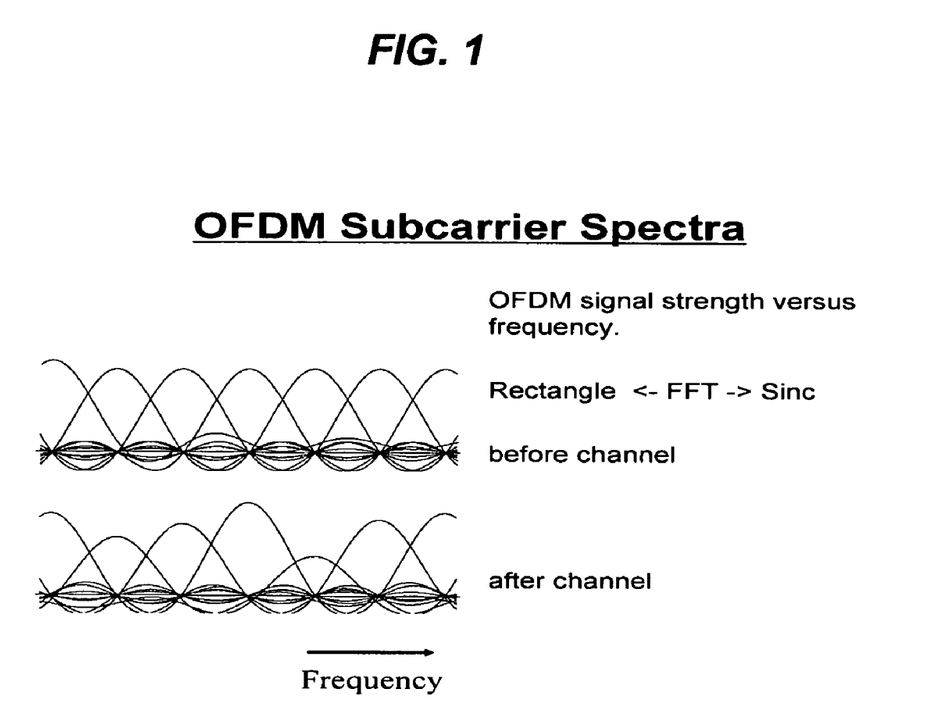
FIG. 1 illustrates the multipath fading in OFDM subcarriers.

The signal based on the sum of the replicas received at a receiver may be degraded or faded due to the multipath nature. Such multipath degradation or fading may be dynamic and thus may vary with time and frequency of a subscriber station. In OFDM and OFDMA systems, signal strengths of different subcarriers generated by a transmitter may undergo significantly different fading in the transmission. For example, the signal strength of one subcarrier may become much greater than that of another subcarrier at the receiver. FIG. 1 illustrates the power imbalance in OFDM subcarriers caused by the multipath fading. The upper graph shows OFDM signals with equal power at the transmitter side. The lower graph shows OFDM signals with unequal power at the receiver due to the multipath fading.

When different subcarriers in the OFDM or OFDMA are perfectly orthogonal to one another, such imbalance in power in the subcarriers does not cause a problem at the receiver due to the orthogonality in frequency so that a subcarrier with a high power level does not affect a subcarrier with a low power level at the receiver.

In practical implementations of OFDM or OFDMA, however, the frequency offset always exists due to a poor stability of the transmitter and receiver oscillators, or Doppler shift in a mobile environment. Accordingly, the subcarriers are not perfectly orthogonal to one another due to the frequency offsets. Such frequency offsets are well recognized. For example, the IEEE 802.16d specification (January, 2004) allows for Subscriber Stations (SS) to be synchronous to a base station (BS) with a tolerance of a maximum of 2% in the frequency offset for the subcarrier spacing.

One of the consequences of the frequency offsets is that subcarriers with frequency offsets can interfere with one another and other subcarriers. Such interference is referred to as "inter-carrier interference (ICI)" in this application. This ICI, when coupled with multipath fading, can lead to an undesired problem at the receiver. More specifically, the multipath fading causes the power difference of subcarriers at the receiver. In presence of the frequency offsets and the associated ICI, the stronger subcarriers can generate stronger ICI to the other subcarriers, e.g. adjacent subcarriers. Notably, if some of the adjacent subcarriers are weak in power at the receiver, the ICI may significantly corrupt the weak subcarriers and may even cause failure in detection of the weak subcarriers. To a certain extent, this adverse effect is analogous to the near-far effect for wireless communications.

A power control mechanism that controls only the average power received at a base station of a signal from a subscriber station does not address the power imbalance in the subcarriers. Therefore, the power imbalance in the subcarriers may still exist at the receiving base station even when the average power received from one subscriber station is controlled to be approximately equal to that of other subscriber stations. Such power imbalance can lead to adverse ICI. Hence, there is a need to provide additional power control mechanism to control the power levels of different group of subcarriers or different individual subcarriers to mitigate the ICI due to the frequency offsets in OFDM or OFDMA over multipath fading.

In implementations, the power levels of individual subcarriers may be controlled at the transmitter so that the power levels of individual subcarriers or the averaged power levels of groups of subcarriers received at the receiver are equal or approximately equal to reduce the ICI-induced degradation of one subcarrier by another interfering subcarrier. Power measurement of the received power levels at the receiver and the power control at the transmitter may be implemented in a dynamic configuration. Exemplary implementations of such power control are described in greater detail below.

Figure 2:
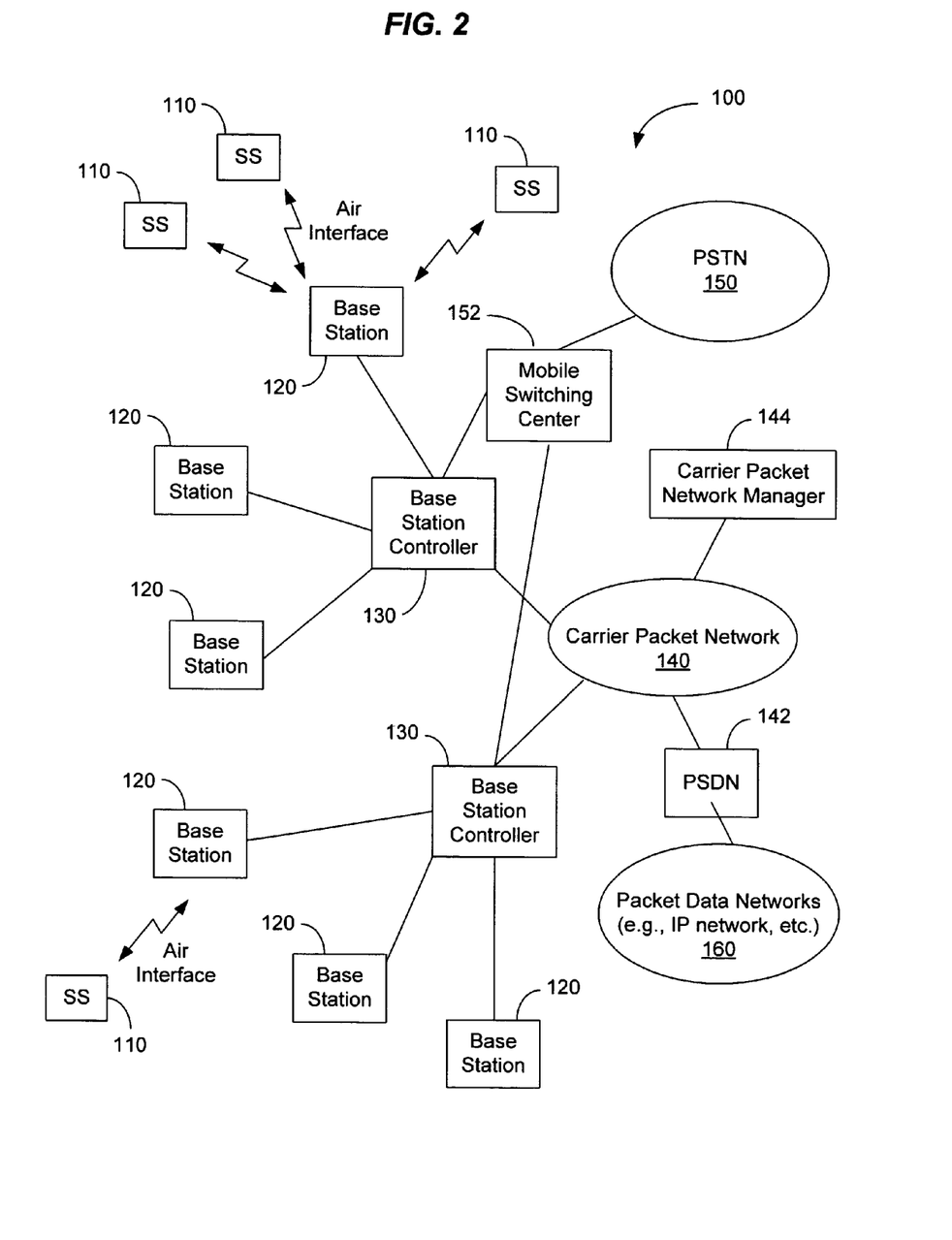
FIG. 2 shows an example of a wireless communication system that may implement a power control mechanism described in this application.

FIG. 2 illustrates an exemplary wireless communication system 100 that uses communication channels at different frequencies under OFDM or OFDMA to provide wireless communication services based on the power control described in this application. The system 100 may include a network of base stations (BSs) or base station transceivers (BSTs) 120 that are spatially distributed in a service area to form a radio access network for wireless subscribers or wireless subscriber stations (SSs) 110. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected to one or more public switched telephone networks (PSTN) 150 and one or more packet data networks 160 (e.g., an IP network). A mobile switching center (MSC) 152 may be used as an interface between the BSCs 130 and the PSTN 150. A packet data serving node 142 may be used to provide an interface between the carrier packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscriber station 110 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscriber station 110 may be any communication device capable of wirelessly communicating with base stations 120.

The system in FIG. 2 may be applied to the communication bands from 2 to 11 GHz under OFDM and OFDMA provided in IEEE 802.16d (January, 2004). In OFDM and OFDMA systems, the available frequency band is divided into subcarriers at different frequencies that are orthogonal. In an OFDMA system, a subchannel is formed from a subset of subcarriers. In OFDMA, a total of 32 sub channels are allocated to each radio cell.

In one implementation of the power control of this application, the received power in each individual subcarrier at a receiver may be controlled to be approximately equal to received power levels of other subcarriers. The receiver here may be a subscriber station when the transmitting device is a base station or a base station when the transmitting device is a subscriber station. The target of subcarrier-based power control is to make the power levels of all subcarriers equal or approximately equal at the receiver. The transmitter may be used to estimate the amplitude of a channel from the transmitter to the receiver, and thus pre-compensate the subcarrier amplitude at the transmitter.

The implementations for Time Division Duplex (TDD) and Frequency Division Duplex (FDD) in an OFDM or OFDMA system may be different. For a TDD-based OFDM or ODFMA system, the uplink and downlink may use the same radio frequency but transmit at different time slots. Hence, the channel fading properties of both uplink (from a SS to a BS) and the downlink (from a BS to a SS) channels are essentially the same, so the information of the power levels of the uplink and downlink obtained at the downlink (or uplink) can be used in the uplink (or downlink). Therefore, the transmitter may adjust the power levels of the outgoing subcarriers based on the known power levels of the same subcarriers received at the receiver in order to balance the power levels of the subcarriers in the opposite link. This power control mechanism does not need any feedback from the receiver to the transmitter. That is, both the measurement of the power levels of the subcarriers and the controlling of the power levels of the subcarriers generated at the transmitter may be carried out at the transmitter.

Figure 3:
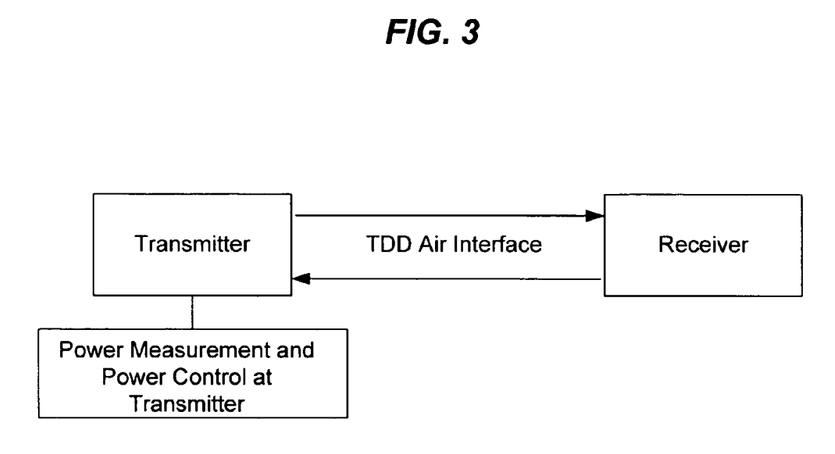
FIG. 3 shows one example of a subcarrier-based power control in a TDD-based OFDM or OFDMA system.

FIG. 3 illustrates this configuration in a TDD-based OFDM or OFDMA system. Each transmitter may use the uplink when it is a subscriber station or the downlink when it is a base station to estimate the signal amplitude at the receiver to pre-compensate the downlink (or uplink) transmitting signal. No delay exists in such a TDD-based system, so the subcarrier-based power control in TDD system can apply to a fast fading channel.

In FDD-based OFDM or OFDMA systems, the uplink and downlink use different radio frequencies and therefore their channel properties usually are not symmetrical. Hence, in order to control the power levels of subcarriers at the transmitter to achieve power balance between different subcarriers at the receiver, the power levels of either individual subcarriers or averaged power levels of groups of subcarriers are measured at the receiver. Accordingly, a feedback mechanism may be used to send the measured power levels at the receiver to the transmitter so that the power control at the transmitter can control the transmitting power levels of the subcarriers to achieve the desired power balance at the receiver.

Figure 4:
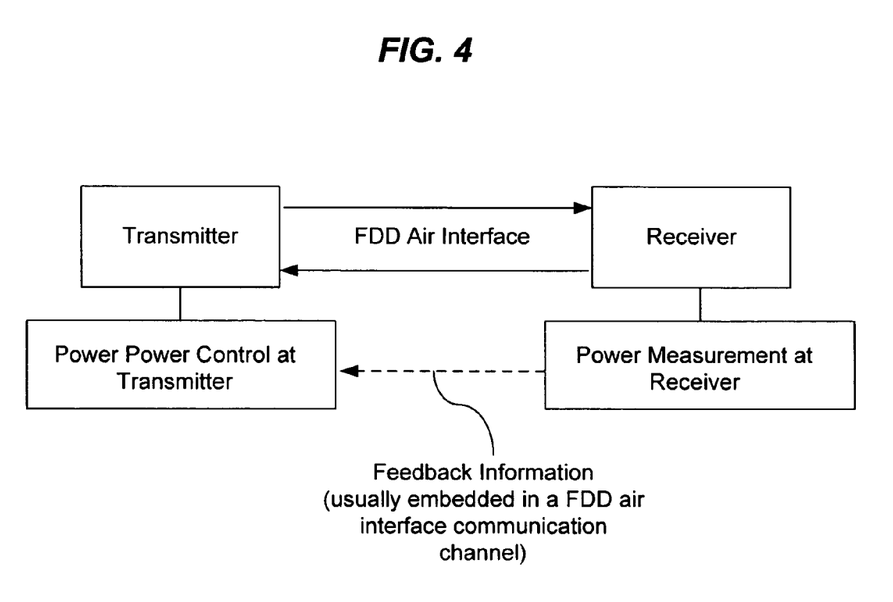
FIG. 4 shows one example of a subcarrier-based power control in a FDD-based OFDM or OFDMA system.

FIG. 4 illustrates this configuration in a FDD-based OFDM or OFDMA system. Due to the separation of the power measurement and the power control, a close-loop subcarrier-based power control may be implemented so the information or results of the power measurement at the receiver may be sent to the power control at the transmitter for controlling the transmitting powers. With this feedback mechanism, the receiver feeds back the channel amplitude information to transmitter, then transmitter uses this information to pre-compensate the power of the transmitting signal of the next OFDM symbol. Different from the TDD-based systems, this feedback control for FDD can have a round-trip delay.

In one exemplary implementation of this power control in FDD-based systems shown in FIG. 4, the feedback information may be embedded as additional power control data bits in the air interface protocols between the base station and the subscriber station. Hence, the air interface protocols in IEEE 802.16d (January 2004) may be modified to provide space for such digital bits for the subcarrier power control. This information for power control is in addition to the power control bits in the protocols based on control of the averaged powers of the subscriber stations.

TABLE A below shows an example for the feedback control channel for a FDD system. This modification may be submitted to the IEEE 802.16d specification in order to support the subcarrier-based power control in FDD systems. In this example, the feedback control channel for uplink user-based power control already existed, named the power control Information Element (IE). In order to support the subcarrier-based power control, the power control IE format is modified.

TABLE A

| SYNTAX | SIZE | NOTES |
| --- | --- | --- |
| Power_Control_IE( ) { | | |
| Extended UIUC | 4 bits | Fast power control = 0x00 |
| Power control based on user average power | 8 bits | Signed integer, which expresses the change in power level (in 0.25 dB units) that the SS should apply to correct its current transmission power. |
| Power control based on subcarriers | 48 * 2 bits | 00-unchanged 01-increase 6 dB, 10-decrease 3 dB, 11-decrease 6 dB |
| } | | |

When the power of each subcarrier is individually measured and controlled in a FDD-based system, the power control channel for each subcarrier is included in the air interface protocols. This may take up a sizable amount of the valuable bandwidth in the communication channels. In order to free up the bandwidth in the communication channels, an alternative implementation is to divide the subcarriers into groups of subcarriers for the purpose of the subcarrier power control. Instead of measuring each individual subcarrier at the receiver, the averaged power of each group of subcarriers is measured at the receiver and the measurement information is fed back to the transmitter so that the transmitting powers of the subcarriers are controlled at the transmitter to make the averaged power levels of different groups at the receiver approximately equal. Therefore, the configuration in FIG. 4 still applies to this implementation but the feedback channel in the air interface only includes power information of the groups of subcarriers rather than all of the individual subcarriers. This grouping reduces the amount of feedback information needed and hence provides more bandwidth in the air interface for transmitting data or other information.

The above second alternative implementation compromises the effectiveness in power control for a gain in the available bandwidth in the air link. Comparing to the power control on the averaged power for one user, this alternative implementation provides additional power control over sub-groups of subcarriers used for a user. Hence, the ICI is reduced. For one user or subscriber station, the subcarriers may be divided into groups with subcarrier power control in different configurations. For example, the adjacent subcarriers may be grouped together to form the groups. As another example, non-adjacent subcarriers may be grouped together.

Figure 5:
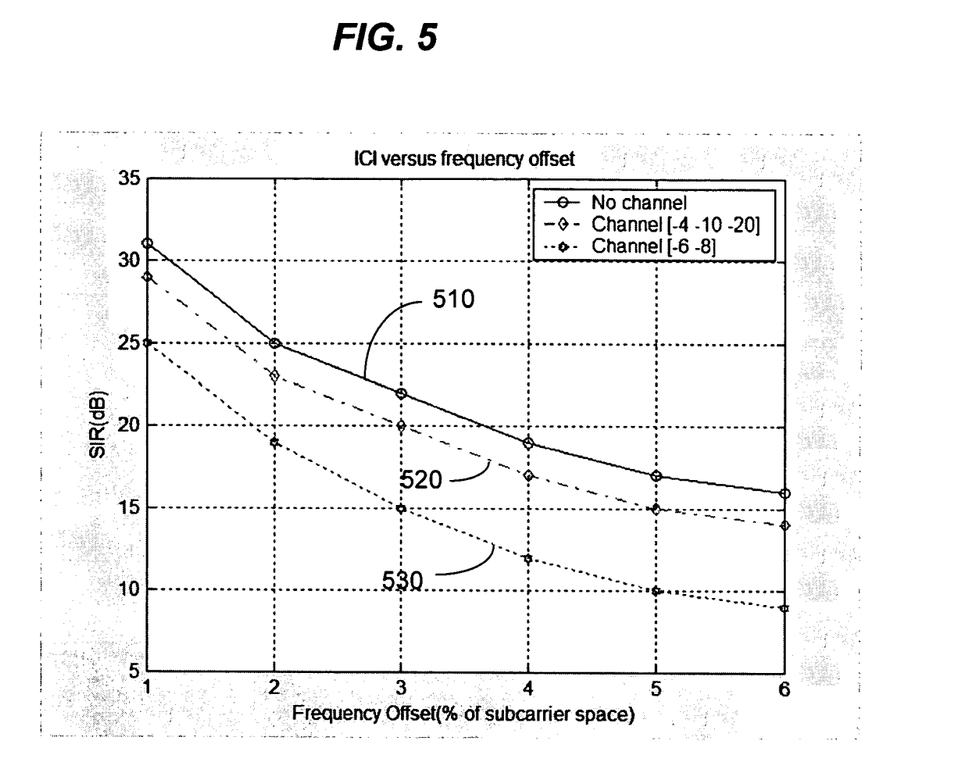
FIGS. 5, 6, and 7 show simulation results of a subcarrier-based power control in some exemplary operating conditions.
Figure 6:
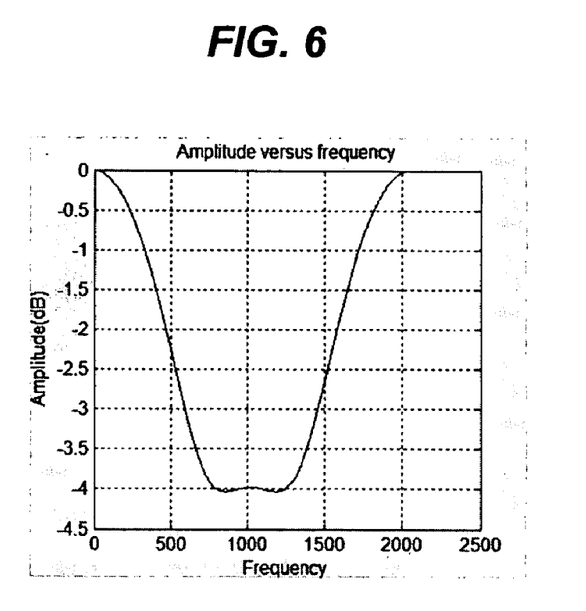
Figure 7:
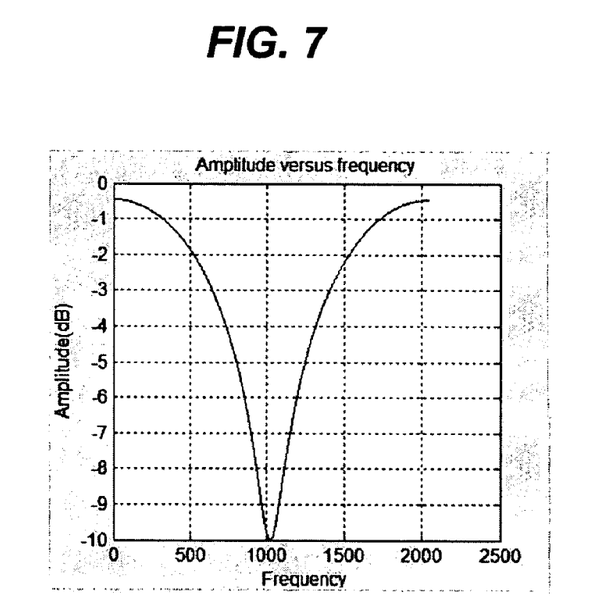

The performance of the above subcarrier power controls can be evaluated by simulation. FIG. 5 shows the signal-to-Inter-Carrier Interference (ICI) ratios (SIR) versus different frequency offset values under three different conditions. In the above simulations, the channel is fully interleaved. The SIR curve 510 represents a first condition where there is no channel fading due to the use of the power control described here and the power levels of subcarriers are exactly the same at the BS receiver. The SIR curve 520 represents a second condition with a 3-path channel where a radio signal has three different signal paths from the transmitter to the receiver. In absence of the power control described here, the path power levels at the receiver are [−4, −10, −20] dB, respectively, in this 3-path channel. FIG. 6 further shows the amplitude of this 3-path channel as a function of the frequency for 2048 sub carriers where the frequency is represented by the channel numbers from 0 to 2048 of the subcarriers. The deep fading of this 3-path channel is up to −4 dB for the subcarriers near the middle of the frequency span of the subcarriers. The SIR curve 530 represents a third condition with a 2-path channel where the path power levels at the receiver are [−6, −8] dB, respectively, in absence of the power control described here. FIG. 7 further shows the amplitude of the 2-path channel as a function of the frequency for 2048 subcarriers where the frequency is represented by the channel numbers from 0 to 2048 of the subcarriers. The deep fading of the 2-path channel is up to −10 dB for the center subcarriers just about the subcarrier number 1000 of the 2048 subcarriers.

FIG. 5 further shows that the SIR performance of 3-path and 2-path channels (520 and 530) in absence of the power control is degraded in comparison with the channel (510) with the power control. For example, at a frequency offset of 2%, the SIR of the 3-path channel drops about 2 dB relative to the SIR of the channel (510) with the power control due to the difference in the power levels of the subcarriers at the receiver. Hence, when the present power control is implemented in the 3-path signal, a gain of 2 dB in the SIR can be achieved. Also, at a frequency offset of 2%, the SIR of the 2-path signal drops about from 6 dB to 7 dB due to the difference in the received power levels of different subcarriers at the receiver relative to the SIR of the channel (510) with the power control. If the present power control is applied to the 2-path channel, a gain of 6 dB to 7 dB in the SIR can be achieved.

Only a few implementations are disclosed. However, it is understood that variations and enhancements may be made.

What is claimed is:

1. A method, comprising:
    measuring power levels of orthogonal frequency division multiplexing (OFDM) subcarriers that are generated from a transmitter and are received at a receiver in a wireless communication system using OFDM subcarriers;
    providing a time division duplex (TDD) in an air link between the transmitter and the receiver;
    estimating a signal amplitude of a signal carrying the OFDM subcarriers to pre-compensate the signal at the transmitter, wherein the pre-compensated signal includes the OFDM subcarriers, is transmitted by the transmitter, and is received at the receiver; and
    controlling transmitting power levels of the OFDM subcarriers at the transmitter in response to the measured power levels and the estimated signal amplitude to make the power levels of subcarriers received at the receiver approximately equal to one another.

2. The method as in claim 1, further comprising:
    separating the OFDM subcarriers into different OFDM subcarrier groups where each OFDM subcarrier group comprises a plurality of OFDM subcarriers that are different from OFDM subcarriers in another OFDM subcarrier group; and
    controlling an averaged power of the OFDM subcarriers group received at the receiver so that received averaged power levels of different OFDM subcarrier groups are approximately equal.

3. The method as in claim 1, wherein the wireless communication system additionally uses a frequency division duplex (FDD) in an air link between the transmitter and the receiver, the method further comprising:
    measuring the power levels of OFDM subcarriers at the receiver;
    sending information on measured power levels of the OFDM subcarriers at the receiver to the transmitter; and
    controlling the transmitter in response to the information.

4. The method as in claim 3, wherein each received OFDM subcarrier is measured at the receiver and data for measured power in each OFDM subcarrier is sent to the transmitter.

5. The method as in claim 3, wherein the received OFDM subcarriers at the receiver from the transmitter are divided into a plurality of groups each having a set of OFDM subcarriers, and wherein received averaged power levels of the groups are measured and information on measured averaged power levels of the groups is sent to the transmitter.

6. The method as in claim 1 further comprising performing both the measuring and the controlling at the transmitter.

7. The method as in claim 1, wherein the system is an orthogonal frequency division multiple access (OFDMA) system.

8. The method of claim 1, wherein measuring power levels of orthogonal frequency division multiplexing (OFDM) subcarriers includes measuring a respective power level of each OFDM subcarrier.

9. The method of claim 8, wherein controlling transmitting power levels of the OFDM subcarriers at the transmitter in response to the measured power levels includes controlling the respective power level of each OFDM subcarrier to be approximately equal to a respective power level of another OFDM subcarrier.

10. A communication system, comprising:
    a plurality of base stations spatially distributed to wirelessly communicate with subscriber stations via radio links that comprise orthogonal frequency division multiplexing (OFDM) subcarriers;
    a plurality of base station controllers, each coupled to control and communicate with two or more base stations within the plurality of base stations;
    a first power control mechanism to measure power levels of OFDM subcarriers in a signal that is either (1) generated at a transmitting subscriber station and received at a receiving base station, or (2) generated at a transmitting base station and received at a receiving subscriber station;
    a second power control mechanism to control an averaged power level of a signal measured at a receiving base station and generated from a transmitting subscriber station to be approximately equal to averaged power levels of signals received at said receiving base station that are generated from other subscriber stations;
    a mechanism that provides a time division duplex (TDD) in an air link between a transmitter and a receiver, wherein the first and the second power control mechanisms are implemented at the transmitter, wherein, in the TDD, the transmitter transmits a pre-compensated signal to the receiver, wherein the pre-compensated signal includes the OFDM subcarriers,
    wherein the second power control mechanism is configured to control transmitting power levels of the OFDM subcarriers at the transmitter in response to the measured power levels and an estimated signal amplitude of the signal carrying the OFDM subcarriers to make the power levels of subcarriers received at the receiver approximately equal to one another.

11. The system as in claim 10, wherein the second power control mechanism operates without a feedback from the receiver to the transmitter.

12. The system as in claim 10, further comprising:
    a mechanism that provides a frequency division duplex (FDD) in an air link between the transmitter and the receiver, wherein the first power control mechanism measures the power levels of OFDM subcarriers at the receiver; and a mechanism that feeds information on measured power levels of the OFDM subcarriers at the receiver to the transmitter, wherein the second power control mechanism controls the transmitter in response to the information.

13. The system of claim 12, wherein the second power control mechanism controls the transmitter to transmit a signal to said receiving base station having a power level approximately equal to the averaged power levels of signals received at said receiving base station.

14. A method, comprising:

transmitting orthogonal frequency division multiplexing (OFDM) subcarriers from a transmitter to a receiver in a wireless communication system that uses OFDM subcarriers and frequency division duplex (FDD) in an air link between the transmitter and the receiver;

separating the OFDM subcarriers into different OFDM subcarrier groups where each OFDM subcarrier group comprises a plurality of OFDM subcarriers that are different from OFDM subcarriers in another OFDM subcarrier group;

measuring an averaged power level of OFDM subcarriers in each of the OFDM subcarrier groups received at the receiver;

communicating the measured averaged power level of each of the OFDM subcarrier groups to the transmitter;

estimating a signal amplitude of a signal carrying the OFDM subcarriers to pre-compensate the signal at the transmitter, wherein the pre-compensated signal includes the OFDM subcarriers, is transmitted by the transmitter, and is received at the receiver; and controlling the transmitting power levels of the OFDM subcarriers at the transmitter, based on the measured averaged power levels and the estimated signal amplitude, to make averaged power levels of different OFDM subcarrier groups approximately equal at the receiver.

15. The method as in claim 14, wherein the wireless communication system is an orthogonal frequency division multiplexing (OFDM) system.

16. The method as in claim 14, wherein the system is an orthogonal frequency division multiple access (OFDMA) system.

17. The method of claim 14, wherein the receiver is a mobile wireless phone.

\* \* \* \* \*

UNITED STATES PATENT AND TRADEMARK OFFICE
CERTIFICATE OF CORRECTION

PATENT NO. : 7,826,435 B1  Page 1 of 1
APPLICATION NO. : 11/072741
DATED : November 2, 2010
INVENTOR(S) : Jun Wu, Keqiang Zhu and Yonggang Fang It is certified that error appears in the above-identified patent and that said Letters Patent is hereby corrected as shown below:

On the Face Page, in Field (60), under "Related U.S. Application Data", in Column 1, Lines 1-2, please delete "Mar. 5, 2005" and insert -- Mar. 5, 2004 --, therefor.

On the Face Page, in the Figure, please delete "Power Power" and insert -- Power --, therefor.

In FIG. 2, Sheet 2 of 5, please delete "  " and insert --         --, therefor.

In FIG. 4, Sheet 3 of 5, please delete "Power Power" and insert -- Power --, therefor.

Signed and Sealed this
Nineteenth Day of April, 2011

David J. Kappos
*Director of the United States Patent and Trademark Office*